(12) United States Patent
Zhang et al.

(10) Patent No.: US 7,112,631 B2
(45) Date of Patent: Sep. 26, 2006

(54) MOISTURE CURED REACTIVE HOT MELT ADHESIVE WITH MONOFUNCTIONAL REACTANTS AS GRAFTING AGENTS

(75) Inventors: Yue S. Zhang, Somerset, NJ (US); Ju-Ming Hung, Yardley, PA (US); Wayne K. Chu, Basking Ridge, NJ (US)

(73) Assignee: National Starch and Chemical Investment Holding Corporation, New Castle, DE (US)

( * ) Notice: Subject to any disclaimer, the term of this patent is extended or adjusted under 35 U.S.C. 154(b) by 287 days.

(21) Appl. No.: 10/280,298

(22) Filed: Oct. 24, 2002

(65) Prior Publication Data

US 2004/0079482 A1 Apr. 29, 2004

(51) Int. Cl.
*C08F 8/30* (2006.01)
*C08L 75/04* (2006.01)
*C09J 175/04* (2006.01)

(52) U.S. Cl. .............. 525/127; 525/129; 525/130; 524/41; 524/271; 524/323; 524/330; 524/409; 524/437; 524/144; 524/94; 156/330.9; 428/423.1

(58) Field of Classification Search ............. 525/453, 525/454, 455, 456, 457, 458, 460; 156/330.9
See application file for complete search history.

(56) References Cited

U.S. PATENT DOCUMENTS

| | | | |
|---|---|---|---|
| 4,863,994 A | 9/1989 | Nelson et al. | |
| 5,018,337 A | 5/1991 | Carter et al. | |
| 5,106,446 A * | 4/1992 | Beck et al. | 156/331.7 |
| 5,166,302 A * | 11/1992 | Werner et al. | 528/67 |
| 5,472,785 A | 12/1995 | Stobbie, IV et al. | |
| 5,545,706 A * | 8/1996 | Barksby et al. | 528/49 |
| 5,827,926 A * | 10/1998 | Shimizu | 525/127 |
| 5,994,493 A * | 11/1999 | Krebs | 528/79 |
| 6,121,354 A * | 9/2000 | Chronister | 524/262 |
| 6,221,978 B1 * | 4/2001 | Li et al. | 525/452 |
| 6,465,104 B1 * | 10/2002 | Krebs et al. | 428/423.1 |
| 6,713,570 B1 * | 3/2004 | Tangen | 525/458 |
| 6,803,412 B1 * | 10/2004 | Nguyen-Misra et al. | 525/102 |
| 2003/0045636 A1 * | 3/2003 | Krebs et al. | 525/127 |

FOREIGN PATENT DOCUMENTS

| | | | |
|---|---|---|---|
| EP | 0 933 412 A1 * | 8/1999 | |
| GB | 2 137 638 A | 10/1984 | |
| WO | WO 95/27748 | 10/1995 | |
| WO | WO 99/28363 | 6/1999 | |
| WO | WO 03/027160 | 4/2003 | |

* cited by examiner

*Primary Examiner*—Randy Gulakowski
*Assistant Examiner*—John J. Figueroa
(74) *Attorney, Agent, or Firm*—Charles W. Almer

(57) ABSTRACT

High green strength reactive hot melt adhesives are prepared using crystalline monofunctional reactants.

15 Claims, No Drawings

MOISTURE CURED REACTIVE HOT MELT ADHESIVE WITH MONOFUNCTIONAL REACTANTS AS GRAFTING AGENTS

FIELD OF THE INVENTION

The invention relates to hot melt adhesives, in particular reactive hot melt adhesives having improved set speed and green strength.

BACKGROUND OF THE INVENTION

Hot melt adhesives are solid at room temperature but, upon application of heat, melt to a liquid or fluid state in which form they are applied to a substrate. On cooling, the adhesive regains its solid form. The hard phase(s) formed upon cooling the adhesive imparts all of the cohesion (strength, toughness, creep and heat resistance) to the final adhesive. Curable hot melt adhesives, which are also applied in molten form, cool to solidify and subsequently cure by a chemical crosslinking reaction. An advantage of hot melt curable adhesives over traditional liquid curing adhesives is their ability to provide "green strength" upon cooling prior to cure.

The majority of reactive hot melts are moisture-curing urethane adhesives. These adhesives consist primarily of isocyanate terminated polyurethane prepolymers that react with surface or ambient moisture in order to chain-extend, forming a new polyurethane polymer. Polyurethane prepolymers are conventionally obtained by reacting diols with diisocyanates. Pure diols are favored for use, instead of polyols with higher functionality, to avoid excessive branching that can lead to poor pot stability. Methylene bisphenyl diisocyanate (MDI) is favored over lower molecular weight isocyanates to minimize volatility. Cure is obtained through the diffusion of moisture from the atmosphere or the substrates into the adhesive, and subsequent reaction. The reaction of moisture with residual isocyanate forms carbamic acid. This acid is unstable, decomposing into an amine and carbon dioxide. The amine reacts rapidly with isocyanate to form a urea. The final adhesive product is a crosslinked material held together primarily through urea groups and urethane groups.

The prior art discloses that the performance of reactive hot melt adhesives for most applications may be substantially improved by the incorporation of acrylic polymers into conventional polyurethane adhesives, in particular reactive hydroxy-containing and non-reactive acrylic copolymers. Improvement in green strength may be obtained by adding higher molecular weight polymers (reactive or not) and/or incorporating crystalline diols, most commonly polyester diols.

These prior art adhesives are extremely tough, with outstanding low temperature flexibility, heat and chemical resistance and specific adhesion to polar substrates. Adhesion to a wide range of other substrates may be obtained through the addition of adhesion promoters such as silane coupling agents. Despite these advances in the art, there remains a need for improvements in reactive hot melt technology to expand the application of such adhesives and their effectiveness in such applications. The present invention addresses this need.

SUMMARY OF THE INVENTION

The invention provides moisture curable reactive hot melt adhesive compositions that have improved set speed and green strength.

One aspect of the invention is directed to a moisture curable hot melt adhesive composition comprising a multifunctional polyisocyanate, at least one or more polymeric diols or triols, a polymeric or non-polymeric crystalline monofunctional reactant, and at least one functional or non-functional thermoplastic.

Another embodiment of the invention is directed to a method of improving the set speed and green strength of a hot melt adhesive comprising adding an effective amount of a monofunctional reactant to a reactive hot melt adhesive formulation.

Yet another embodiment of the invention is directed to a method for bonding materials together which comprises applying the reactive hot melt adhesive composition of the invention in a liquid form to a first substrate, bringing a second substrate in contact with the composition applied to the first substrate, and subjecting the applied composition to conditions which will allow the composition to cool and cure to an irreversible solid form, said conditions comprising moisture.

Still another aspect of the invention is directed to an article of manufacture comprising the adhesive of the invention.

DETAILED DESCRIPTION OF THE INVENTION

All percents are percent by weight of the adhesive composition, unless otherwise stated.

It has now been discovered that high green strength reactive hot melt adhesives may be prepared using any functional group that is capable of reacting with isocyanate. The adhesives of the invention have good green strength and maintain fast setting and crosslinkability.

The moisture curable, hot melt polyurethane adhesives of the invention may be prepared through the reaction of a mixture of non-polymeric or polymeric monofunctional reactants, with a multifunctional polyisocyanate-containing compound, one or more polymeric diols or triols, and preferably, a thermoplastic polymer, at a temperature of from about 120° F. to about 275° F. The adhesives of the invention comprise an multifunctional polyisocyanate, MDI being preferred, from about 0.1 to about 30 wt % and preferably from about 5 to about 20 wt % of a monofunctional reactant, and from about 0 to about 90 wt % and preferably from about 5 to about 80 wt % and most preferably from about 10 to about 70 wt % of a polyester polyol, and from about 0 to about 80 wt % and preferably from about 5 to about 80 wt % and most preferably from about 10 to about 70 wt % of a polyether polyol.

To obtain the adhesive of the invention, various monofunctional reactants that are capable of reacting with isocyanate, such as hydroxyl, carboxyl, thiol, amine, mercapto and amides may be utilized, whether polymeric or non-polymeric. One preferred reactant is low molecular weight linear polyethylene monoalcohols, commercially available as UNILIN from Baker Petrolites. These materials have melting points ranging from about 60° C. to about 110° C. By partially reacting the monoalcohols with the polyisocyanate end group of the polyurethane prepolymers, a hot melt that is able to crosslink under moisture is obtained. Upon cooling from the melt, the setting of the short polyethylene segments at the end of the prepolymer freezes the movement of the entire chain, resulting in the setting of the hot melt adhesive. As a result, the formulation is fast setting even without crystalline polymers, including polyester diols, which are not necessary for the formulation. Another preferred reactant is polyethylene-block-polyethylene glycol, commercially available as UNITHOX (Baker Petrolites). As with the monoalcohol reactant, the polymer based tail would generate green strength, but the uncapped—NCO end would still be available for curing and forming a crosslinked polyurethane network. A still further preferred embodiment are ring-opened polyesters and polyamides that are monofunctional.

The reactive hot melt compositions formed with the monofunctional reactant have a unique architecture as opposed to standard reactive hot melt compositions. The architecture of such reactive hot melts is a long flexible middle chain as the backbone of polyurethane. The backbone should be no less than 400 in Mn, and preferably in the range of about 1000–25000. Various components, such as polyol, PEG, PPG, hydroxyl-terminated Poly BD, polycaprolactone, polyTHF, copolymers thereof or other functionalized polymers. Monofunctional reactants that can react with isocyanate, such as hydroxyl, carboxyl, thiol, amine, mercapto and amides may be utilized. The end groups, and properties of the reactive hot melt adhesive, will vary depending upon the material utilized.

The reactive hot melt compositions of the invention are useful for bonding articles composed of a wide variety of substrates (materials), including but not limited to wood, metal, polymeric plastics, glass and textiles. As such, these adhesives find particular use in applications such as use in water towers, for bonding to exterior surfaces, bonding to wood with high levels of pitch and e.g., in marine and automotive applications. Other non-limiting uses include textile bonding applications (carpet and clothing), use in the manufacture of footwear (shoes), use as a glazing/backbedding compound in the manufacture of windows, use in the manufacture of doors including entry doors, garage doors and the like, use in the manufacture of architectural panels, use in bonding components on the exterior of vehicles, and the like.

The urethane prepolymers that can be used to prepare the adhesives of the invention are those conventionally used in the production of polyurethane hot melt adhesive compositions. Any suitable compound, which contains two or more isocyanate groups, may be used for preparing the urethane prepolymers. Typically from about 2 to about 25 parts by weight of an isocyanate is used.

Organic polyisocyanates, which may be used to practice the invention, include alkylene diisocyanates, cycloalkylene diisocyanates, aromatic diisocyanates and aliphatic-aromatic diisocyanates. Specific examples of suitable isocyanate-containing compounds include, but are not limited to, ethylene diisocyanate, ethylidene diisocyanate, propylene diisocyanate, butylene diisocyanate, trimethylene diisocyanate, hexamethylene diisocyanate, toluene diisocyanate, cyclopentylene-1,3-diisocyanate, cyclo-hexylene-1,4-diisocyanate, cyclohexylene-1,2-diisocyanate, 4,4'-diphenylmethane diisocyanate, 2,2-diphenylpropane-4,4'-diisocyanate, xylylene diisocyanate, 1,4-naphthylene diisocyanate, 1,5-naphthylene diisocyanate, m-phenylene diisocyanate, p-phenylene diisocyanate, diphenyl-4,4-diisocyanate, azobenzene-4,4'-diisocyanate, diphenylsulphone-4,4'-diisocyanate, 2,4-tolylene diisocyanate, dichlorohexa-methylene diisocyanate, furfurylidene diisocyanate, 1-chlorobenzene-2,4-diisocyanate, 4,4',4"-triisocyanatotriphenylmethane, 1,3,5-triisocyanato-benzene, 2,4,6-triisocyanato-toluene, 4,4'-dimethyldiphenyl-methane-2,2',5,5-tetratetraisocyanate, and the like. While such compounds are commercially available, methods for synthesizing such compounds are well known in the art. Preferred isocyanate-containing compounds are methylenebisphenyldiisocyanate (MDI), isophoronediisocyanate (IPDI), hydrogenated methylenebisphenyldiisocyanate (HMDI) and toluene diisocyanate (TDI).

Most commonly, the prepolymer is prepared by the polymerization of a polyisocyanate with a polyol, most preferably the polymerization of a diisocyanate with a diol. The polyols used include polyhydroxy ethers (substituted or unsubstituted polyalkylene ether glycols or polyhydroxy polyalkylene ethers), polyhydroxy polyesters, the ethylene or propylene oxide adducts of polyols and the monosubstituted esters of glycerol, as well as mixtures thereof. The polyol is typically used in an amount of between about 10 to about 70 parts by weight.

Preferably the adhesive is prepared by including a thermoplastic polymer. The thermoplastic polymer may be either a functional or a non-functional thermoplastic. Suitable thermoplastic polymers include acrylic polymers, functional acrylic polymers, non-functional acyrlic polymers, hydroxy functional acrylic polymers, polyvinyl acetate, polyvinyl chloride, methylene, polyvinyl ether, cellulose, acetate, styrene acrylonitrile, amorphous polyolefin, thermoplastic urethane, polyacrylonitrile, polybutadiene diol, isobutylene diol and mixtures thereof.

Examples of polyether polyols include a linear and/or branched polyether having plural numbers of ether bondings and at least two hydroxyl groups, and contain substantially no functional group other than the hydroxyl groups. Examples of the polyether polyol may include polyoxyalkylene polyol such as polyethylene glycol, polypropylene glycol, polybutylene glycol and the like. Further, a homopolymer and a copolymer of the polyoxyalkylene polyols may also be employed. Particularly preferable copolymers of the polyoxyalkylene polyols may include an adduct at least one compound selected from the group consisting of ethylene glycol, propylene glycol, diethylene glycol, dipropylene glycol, triethylene glycol, 2-ethylhexanediol-1,3,glycerin, 1,2,6-hexane triol, trimethylol propane, trimethylol ethane, tris(hydroxyphenyl)propane, triethanolamine, triisopropanolamine, ethylenediamine and ethanolamine; with at least one compound selected from the group consisting of ethylene oxide, propylene oxide and butylene oxide.

A number of suitable polyols are commercially available. Non-limiting examples include CP4701 (Dow Chemicals), Niax 11-34 (Union Carbide Corp), Desmorphen 3900 (Bayer), Propylan M12 (Lankro Chemicals), Highflex 303 (Daiichi Kogyo Seiyaku K.K.) and Daltocel T 32-75 (ICI). "Polymer polyols" are also suitable, i.e., graft polyols containing a proportion of a vinyl monomer, polymerized in situ, e.g., Niax 34-28.

Polyester polyols are formed from the condensation of one or more polyhydric alcohols having from 2 to 15 carbon atoms with one or more polycarboxylic acids having from 2 to 14 carbon atoms. Examples of suitable polyhydric alcohols include ethylene glycol, propylene glycol such as 1,2-propylene glycol and 1,3-propylene glycol, glycerol, pentaerythritol, trimethylolpropane, 1,4,6-octanetriol, butanediol, pentanediol, hexanediol, dodecanediol, octanediol, chloropentanediol, glycerol monallyl ether, glycerol monoethyl ether, diethylene glycol, 2-ethylhexanediol-1,4,cyclohexanediol-1,4,1,2,6-hexanetriol, 1,3,5-hexanetriol, 1,3-bis-(2-hydroxyethoxy)propane and the like. Examples of polycarboxylic acids include phthalic acid, isophthalic acid, terephthalic acid, tetrachlorophthalic acid, maleic acid, dodecylmaleic acid, octadecenylmaleic acid, fumaric acid, aconitic acid, trimellitic acid, tricarballylic acid, 3,3'-thiodipropionic acid, succinic acid, adipic acid, malonic acid, glutaric acid, pimelic acid, sebacic acid, cyclohexane-1,2-dicarboxylic acid, 1,4-cyclohexadiene-1,2-dicarboxylic acid, 3-methyl-3,5-cyclohexadiene-1,2-dicarboxylic acid and the corresponding acid anhydrides, acid chlorides and acid esters such as phthalic anhydride, phthaloyl chloride and the dimethyl ester of phthalic acid. Preferred polycarboxylic acids are the aliphatic and cycloaliphatic dicarboxylic acids containing no more than 14 carbon atoms and the aromatic dicarboxylic acids containing no more than 14 atoms.

Commercially available polyols which may be used in the practice of the invention include polyethers such as ARCOL PPG 2025 (Bayer), PolyG 20-56 (Arch) and Pluracol P-2010 (BASF), polyesters such as Dynacoll 7360 (Creanova), Fomrez 66-32 (Crompton) and Rucoflex S-105-30 (Bayer) and polybutadiene such as PolyBD R-45HTLO (Elf Atochem).

In addition, the urethane prepolymers may be prepared by the reaction of a polyisocyanate with a polyamino or a polymercapto-containing compound such as diamino polypropylene glycol or diamino polyethylene glycol or polythioethers such as the condensation products of thiodiglycol either alone or in combination with other glycols such as ethylene glycol, 1,2-propylene glycol or with other polyhydroxy compounds disclosed above. In accordance with one embodiment of the invention, the hydroxyl containing acrylic polymer may function as the polyol component, in which case, no additional polyol need be added to the reaction.

Further, small amounts of low molecular weight dihydroxy, diamino, or amino hydroxy compounds may be used such as saturated and unsaturated glycols, e.g., ethylene glycol or condensates thereof such as diethylene glycol, triethylene glycol, and the like; ethylene diamine, hexamethylene diamine and the like; ethanolamine, propanolamine, N-methyldiethanolamine and the like.

Virtually any ethylenically unsaturated monomer containing a functionality averaging one may be utilized in the compositions of the present invention. Functional monomers include, without limitation acid, hydroxy, amine, isocyanate, and thio functional monomers. Hydroxyl functionality is preferred and is described in detail herein.

Most commonly employed are hydroxyl substituted $C_1$ to $C_{12}$ esters of acrylic and methacrylic acids including, but not limited to hydroxyl substituted methyl acrylate, ethyl acrylate, n-butyl acrylate, 2-ethylhexyl acrylate, isobutyl acrylate, n-propyl or iso-propyl acrylate or the corresponding methacrylates. Mixtures of compatible (meth)acrylate monomers may also be used. Additional monomers that may be used include the hydroxyl substituted vinyl esters (vinyl acetate and vinyl propionate), vinyl ethers, fumarates, maleates, styrene, acrylonitrile, thermoplastic urethanes, amorphous polyolefins, as well as comonomers thereof.

These monomers may blended with other copolymerizable comonomers as formulated so as to have a wide range of Tg values, as between about −60° C. and 105° C., preferably 15° C. to 85° C. Suitable comonomers include the $C_1$ to $C_{12}$ esters of acrylic and methacrylic acids including, but not limited to methyl acrylate, ethyl acrylate, n-butyl acrylate, isobutyl acrylate, 2-ethylhexyl acrylate, n-propyl or iso-propyl acrylate or the corresponding methacrylates. Mixtures of compatible (meth)acrylate monomers may also be used. Additional monomers that may be used include the vinyl esters (vinyl acetate and vinyl propionate), vinyl ethers, fumarates, maleates, styrene, acrylonitrile, ethylene, etc. as well as comonomers thereof. The hydroxyl containing monomers may be the same or different from the monomers used in the remainder of the acrylic polymerization. The particular monomers selected will depend, in large part, upon the end use for which the adhesives are intended. Thus, adhesives to be used in pressure sensitive applications or in applications wherein adhesion to metal is required will be selected to obtain a lower Tg polymer than may be desired in non-pressure sensitive applications or those involving more easily bonded substrates.

When the adhesive is to be prepared utilizing monomeric materials, the respective monomers may be added to the polyols and polymerized therein prior to formation of the prepolymer or may be added to the already formed prepolymer and the acrylic polymerization subsequently performed. In the case of polyamino or polymercapto containing prepolymers, in-situ vinylic polymerization must be performed only in the pre-formed prepolymer.

The hydroxyl containing ethylenically unsaturated monomer is polymerized using conventional free radical polymerization procedures to a relatively low molecular weight. For purposes of clarification, use of the term "low molecular weight" means number average molecular weights in the range of approximately 1,000 to 50,000, preferred for use are monomers having an average molecular weight in the range of from about 5,000 to about 30,000. Molecular weight distribution is characterized by Gel Permeation Chromatography using a PL Gel, Mixed 10 micron column, a Shimadzu Model RID 6A Detector with a tetrahydrofuran carrier solvent at a flow rate of 1 milliliter per minute. The low molecular weight is obtained by carefully monitoring and controlling the reaction conditions and, generally, by carrying out the reaction in the presence of a chain transfer agent such as dodecyl mercaptan. Subsequent to the polymerization of the ethylenically unsaturated monomer(s), the polyisocyanate and any additional ingredients required for the urethane prepolymer forming reaction are added and that reaction is carried out using conventional condensation polymerization procedures. In this manner, the resultant isocyanate terminated urethane prepolymer forms the reactive curing hot melt adhesive described above which contains about 2 to about 90% of the low molecular weight hydroxyl containing polymer.

It is also possible to polymerize the low molecular weight polymer in the presence of the already formed isocyanate terminated urethane prepolymer. This method has the drawback of subjecting the prepolymer to unnecessary heating during the acrylic polymerization, heating that might result in branching, viscosity increase, depletion of needed isocyanate groups and possible gellation. Although these disadvantages are subject to control, more stringent control of conditions is required as compared to polymerization in the non-isocyanate functional urethane components. When the reaction is run in the polyol or other non-isocyanate containing component, there is also the advantage of lower reaction viscosities and reduced exposure to isocyanate vapors because of the lesser amount of heating required.

Optionally, the hydroxyl containing functionality may be introduced into the adhesive in the form of pre-polymerized low molecular weight hydroxyl containing polymers. In the latter case, typical polymers include hydroxyl substituted butyl acrylate, hydroxylated butyl acrylate/methyl methacrylate copolymers, hydroxylated ethyl acrylate/methyl methacrylate copolymers, and the like. Preferred polymers have a number average molecular weight of 5,000 to 30,000 and a hydroxyl number of 4 to 30. If used in the form of low molecular weight polymers, the polymers may be blended with the polyol prior to reaction thereof with the isocyanate or they may be added directly to the isocyanate terminated prepolymer.

While the adhesives may be used directly as described above, if desired the adhesives of the present invention may also be formulated with conventional additives that are compatible with the composition. Such additives include plasticizers, compatible tackifiers, curing catalysts, dissociation catalysts, fillers, anti-oxidants, pigments, adhesion promoters, stabilizers, aliphatic $C_5$-$C_{10}$ terpene oligomers and the like. Conventional additives that are compatible with a composition according to this invention may simply be determined by combining a potential additive with the composition and determining if they are compatible. An additive is compatible if it is homogenous within the product. Non-limited examples of suitable additives include, without limitation, rosin, rosin derivatives, rosin ester, aliphatic hydrocarbons, aromatic hydrocarbons aromatically modified aliphatic hydrocarbons, terpenes, terpene phenol, modified terpene, high molecular weight hindered phenols and multifunctional phenols such as sulfur and phosphorous-containing phenol, terpene oligomers, DMDEE, paraffin waxes, microcrystalline waxes, castor oil and hydrogenated castor oil.

The reactive hot melt adhesives of the invention may also contain flame retardant components. Fire retardant additives known in the art for imparting flame resistance to polyurethane compositions may be added. Such compounds include inorganic compounds such as a boron compound, aluminum hydroxide, antimony trioxide and the like, and other halogen compounds including halogen-containing phosphate compounds such as tris(chloroethyl)phosphate, tris(2,3-dichloropropyl)-phosphate, and the like. These and other flame retarding compositions are described in U.S. Pat. Nos. 3,773,695 4,266,042, 4,585,806, 4,587,273 and 4,849,467, and European Patent No. 0 587 942. In a preferred embodiment, ethylenebistetrabromophthalimide and/or tris(2,3-dibromopropyl)-isocyanurate is added as a prime flame retardant component. The ethylenebistetrabromophthalimide and/or tris(2,3-dibromopropyl)isocyanurate may be used with or without other flame retardants. The composition may further comprise a chlorinated paraffin and/or an aryl phosphate ester as a further flame retardant component. The optional chlorinated paraffin imparts flame retardancy as well as performing as a viscosity modifier. The aryl phosphate ester further imparts improved adhesion to the substrates. The flame retardant polyurethane-based reactive hot melt adhesives when used in the practice of the invention gives excellent flame retardancy while maintaining the targeted properties of the base polymer, such as good green strength, controlled setting speed and good thermal stability at elevated temperatures.

The invention also provides a method for bonding articles together which comprises applying the reactive hot melt adhesive composition of the invention in a liquid melt form to a first article, bringing a second article in contact with the composition applied to the first article, and subjecting the applied composition to conditions which will allow the composition to cool and cure to a composition having an irreversible solid form, said conditions comprising moisture. The composition is typically distributed and stored in its solid form, and is stored in the absence of moisture. When the composition is ready for use, the solid is heated and melted prior to application. Thus, this invention includes reactive polyurethane hot melt adhesive compositions in both its solid form, as it is typically to be stored and distributed, and its liquid form, after it has been melted, just prior to its application.

After application, to adhere articles together, the reactive hot melt adhesive composition is subjected to conditions that will allow it to solidify and cure to a composition that has an irreversible solid form. Solidification (setting) occurs when the liquid melt is subjected to room temperature. Curing, i.e. chain extending, to a composition that has an irreversible solid form, takes place in the presence of ambient moisture.

As used herein, "irreversible solid form" means a solid form comprising polyurethane polymers extended from the aforementioned polyurethane prepolymers. The composition having the irreversible solid form typically can withstand temperatures of up to 150° C. Using a flame retardant the thermal stability of the irreversible solid can be improved.

The invention is further illustrated by the following non-limiting examples.

EXAMPLES

In the Examples that follow, the following tests were used to determine viscosity and dynamic peel rate.

Viscosity:

Brookfield Viscometer with Thermosel heating unit, spindle 27

Dynamic Peel:

A 6 mil film of the adhesive was applied to a glass plate, preheated at 120° C. A strip of vinyl (16 mm wide, 7 mil thick) with a hole punched near one end was applied over the adhesive. The plate is inverted and, at several temperature intervals, a 103 g weight was applied to the hole in the vinyl for 10–60 seconds. The peel rate at these intervals was calculated.

Example 1

Reactive hot melt adhesives having the formulations shown in Table 1 (% by weight) were prepared. All the polyols and acrylic polymers (reactive or not) were added to melt and mix under vacuum until homogeneous and free of moisture. Then MDI was added and polymerization allowed to proceed with mixing under vacuum until reaction is complete. The resulting pre-polymer was then placed into a container under a dry nitrogen headspace to prevent exposure to moisture.

TABLE 1

Formulations of Reactive Hot Melt Adhesives
With and Without Monoalcohols

| | Sample | | | |
|---|---|---|---|---|
| | A | B | C | D |
| Modaflow | 0.6 | 0.6 | 0.6 | 0.6 |
| PolyG 20-56 | | | 5.0 | 5.0 |
| PolyG 20-28 | 80.0 | 80.0 | 75.0 | 75.0 |
| Elvacite 2902 | 5.0 | 5.0 | 5.0 | 5.0 |
| Elvacite 2967 | 45.0 | 45.0 | 45.0 | 45.0 |
| Unilin 425 | | 12.0 | | 10.0 |
| Unilin 350 | | | 8.0 | |

TABLE 1-continued

Formulations of Reactive Hot Melt Adhesives With and Without Monoalcohols

| | Sample | | | |
|---|---|---|---|---|
| | A | B | C | D |
| MDI | 15.0 | 17.3 | 17.5 | 17.7 |
| DMDEE | 0.15 | 0.16 | 0.16 | 0.32 |

ELVACITE 2902 (a 60,000 Mw acrylic - available from Lucite)
ELVACITE 2967 (a 18,500 Mw acrylic - available from Lucite)
MODAFLOW (an acrylic defoamer available from Solutia)
MDI
PolyG 20-56 (a 2000 Mw polyether polyol available from Arch)
PolyG 20-28 (a 4000 Mw polyether polyol available from Arch)
UNILIN 425 (a 425 Mn polyethylene monoalcohol available from Baker Petrolites)
UNILIN 350 (a 350 Mn polyethylene monoalcohol available from Baker Petrolites)

The results of testing on the formulas of Table 1 are illustrated in Table 2.

TABLE 2

Reactive Hot Melt Properties With and Without Monoalcohols

| | A | B | C | D |
|---|---|---|---|---|
| Viscosity (cps) 250° F. | 1400 | 1700 | | |
| Viscosity (cps) 200° F. | 4575 | | 5000 | 8175 |
| Melt Stability % | 1.1 | 3.1 | 5.1 | 4.5 |
| Dynamic Peel Strength (mm/° C.) | 20/26.0 | 0/37.0 | 2/26.9 | 8/29.1 |

This data shows that high green strength reactive hot melts can be prepared using monoalcohols as crystalline monofunctional reactants. The data also shows that a formulation containing only polyether polyol and acrylics will give less green strength. The addition of the crystalline monofunctional increased both the set speed and the green strength.

Example 2

Reactive hot melt adhesives were formulated according to the process of Example 1, however the formulations were prepared with and without monoalcohols and with triol and/or multifunctional isocyanates. The formulations are shown in Table 3.

TABLE 3

Reactive Hot Melt Formulations With and Without Monoalcohols and With Triols and/or Multifunctional Isocyanates

| | Sample | | | |
|---|---|---|---|---|
| | E | F | G | H |
| Modaflow | 0.6 | 0.6 | 0.6 | 0.6 |
| Acclaim 8200 | | | | 15.0 |
| PolyG 20-28 | 18.0 | | 18.0 | 18.0 |
| PolyG 30-42 | | | 2.0 | 2.0 |
| Dianal BR-106 | 20.0 | 20.0 | 25.0 | 20.0 |
| Elvacite 2967 | 40.0 | 40.0 | 40.0 | 40.0 |
| Unilin 700 | | 12.0 | 10.0 | 10.0 |
| MDI | 7.79 | 7.39 | 7.39 | 5.43 |
| DMDEE | 0.09 | 0.11 | 0.11 | 0.10 |
| Mondur MR | 3.54 | 4.0 | 4.12 | 3.72 |

ACCLAIM 8200 (8000 Mw low monol content polyether polyol from Bayer)
PolyG 30-42 (3000 Mw polyether triol from Arch)
Dianal BR-106 (acrylic copolymer available from Dai America)
Unilin 700 (a 700 Mn polyethylene monoalcohol from Baker Petrolites)
Mondur MR (polymeric isocyanate available from Bayer)

The adhesive properties of samples E–H are shown in Table 4.

TABLE 4

Reactive Hot Melt Properties With and Without Monoalcohols and With Triols and/or Multifunctional Isocyanates

| | Sample | | | |
|---|---|---|---|---|
| | E | F | G | H |
| Viscosity (cps) 275° F. | 10130 | 16500 | 28000 | 41200 |
| Melt Stability % | 0.7 | 0 | 0 | 1.0 |
| Dynamic Peel Strength (mm/° C.) | 0/33.0 | 0/57.0 | 0/60.0 | 0/63.0 |

Table 4 illustrates that reactive hot melt adhesives having a fast set speed and high green strength may be prepared using monoalcohols and without polyester polyol.

Many modifications and variations of this invention can be made without departing from its spirit and scope, as will be apparent to those skilled in the art. The specific embodiments described herein are offered by way of example only, and the invention is to be limited only by the terms of the appended claims, along with the full scope of equivalents to which such claims are entitled.

The invention claimed is:

1. A polyurethane hot melt adhesive composition consisting essentially of polyisocyanate, one or more polymeric polyols, a crystalline monofunctional, polymeric reactant and a functional thermoplastic polymer, wherein the one or more polymeric polyols is not a polyester polyol, wherein the adhesive comprises from about 5 wt % to about 20 wt % of the reactant and wherein the thermoplastic polymer is selected from the group comprising acrylic polymers, hydroxy functional acrylic polymers, polyvinyl acetate, polyvinyl chloride, methylene polyvinyl ether, cellulose acetate, styrene acrylonitrile, amorphous polyolefin, thermoplastic urethane, polyacrylonitrile, polybutadiene, and mixtures thereof.

2. The adhesive of claim 1, wherein the reactant is selected from the group comprising hydroxyl reactants, carboxyl reactants, thiol, amine and mixtures thereof.

3. The adhesive of claim 2, wherein the polymeric polyol is a polyether polyol.

4. The adhesive of claim 2, wherein the reactant is selected from the group comprising a low molecular weight linear polyethylene monoalcohol, polyethylene-block-polyethylene glycol, monol-terminated ring-opened polyesters, monol-terminated ring-opened polyamides, or mixtures thereof.

5. The adhesive of claim 4, wherein the reactant is a low molecular weight linear polyethylene monoalcohol.

6. The adhesive of claim 2, further comprising plasticizers, compatible tackifiers, curing catalysts, dissociation catalysts, fillers, anti-oxidants, pigments, adhesion promoters, stabilizers, aliphatic $C_5$–$C_{10}$ terpene oligomers, rosin, rosin derivatives, rosin ester, aliphatic hydrocarbons, aromatic hydrocarbons aromatically modified aliphatic hydrocarbons, terpenes, terpene phenol, modified terpene, high molecular weight hindered phenols, multifunctional phenols, sulfur-containing phenol, phosphorous-containing phenol, terpene oligomers, DMDEE, paraffin waxes, microcrystalline waxes, castor oil, hydrogenated castor oil, fire retardant additives, boron compound, aluminum hydroxide, antimony trioxide, halogen compounds, halogen-containing phosphate compounds, tris(chloroethyl)phosphate, tris(2,3-dichloropropyl)-phosphate, ethylenebistetrabromophthalimlde, tris (2,3-dibromopropyl)-isocyanurate and mixtures thereof.

7. A method of improving the set speed of a polyurethane adhesive comprising one or more polymeric polymeric polyols that are not a polyester polyol, comprising adding an effective amount of a crystalline monofunctional reactant to an adhesive formulation, wherein the adhesive comprises a functional thermoplastic polymer and wherein the adhesive comprises from about 5 to about 20 wt % of the reactant and the reactant is selected from the group comprising hydroxvl reactants, carboxyl reactants, and mixtures thereof.

8. The adhesive of claim 7, wherein the thermoplastic polymer is selected from the group comprising acrylic polymers, functional acrylic polymers, hydroxy functional acrylic polymers, polyvinyl acetate, polyvinyl chloride, methylene polyvinyl ether, cellulose acetate, styrene acrylonitrile, amorphous polyolefin, thermoplastic urethane, polyacrylonhtrile, polybutadiene, isobutylene diol, and mixtures thereof.

9. The method of claim 7, further comprising a polyether polyol.

10. The method of claim 7, wherein the reactant is selected from the group comprising a low molecular weight linear polyethylene monoalcohol, polyethylene-block - polyethylene glycol, monol-terminated ring-opened polyesters, or mixtures thereof.

11. The method of claim 10, wherein the reactant is a low molecular weight polyethylene monoalcohol.

12. A method of bonding materials together which comprises applying the reactive hot melt adhesive composition of claim 1 in a liquid form to a first substrate, bringing a second substrate in contact with the composition applied to the first substrate, and subjecting the compositions to conditions which will allow the compositions to cool and cure to an irreversible solid form, the conditions comprising moisture.

13. The method of claim 12, wherein the reactant is selected from the group comprising hydroxyl reactants, carboxyl reactants, and mixtures thereof.

14. The method of claim 13, wherein the reactant is selected from the group comprising a low molecular weight linear polyethylene monoalcohol, polyethylene-block-polyethylene-glycol, monol-terminated ring-opened polyesters, or mixtures thereof.

15. An article of manufacture comprising the adhesive of claim 1.

\* \* \* \* \*